United States Patent
Schultz et al.

[11] Patent Number: 5,959,824
[45] Date of Patent: Sep. 28, 1999

[54] TRANSIENT MAGNETIC FIELD DEGAUSSING SYSTEM WITH AUTO CALIBRATION

[75] Inventors: Robert A. Schultz; Leroy D. Thiel, both of Lincoln, Nebr.

[73] Assignee: Data Security, Inc., Lincoln, Nebr.

[21] Appl. No.: 09/047,843

[22] Filed: Mar. 25, 1998

[51] Int. Cl.⁶ .................................................. H01F 13/00
[52] U.S. Cl. ............................................ 361/151; 361/267
[58] Field of Search .................................... 361/149, 151, 361/267, 143

[56] References Cited

U.S. PATENT DOCUMENTS

| | | |
|---|---|---|
| 2,481,392 | 9/1949 | Camras . |
| 2,962,560 | 11/1960 | Folse . |
| 3,023,280 | 2/1962 | Tronslin et al. . |
| 3,078,396 | 2/1963 | Engelsted . |
| 3,143,689 | 8/1964 | Hall . |
| 3,588,623 | 6/1971 | Camras . |
| 3,872,347 | 3/1975 | Matsushima et al. . |
| 3,879,633 | 4/1975 | Stark, Jr. . |
| 3,879,754 | 4/1975 | Ballinger . |
| 3,938,011 | 2/1976 | Littwin . |
| 4,346,426 | 8/1982 | Baumann et al. . |
| 4,378,581 | 3/1983 | Kuno et al. . |
| 4,423,460 | 12/1983 | Jackson et al. . |
| 4,467,389 | 8/1984 | Knipp . |
| 4,551,782 | 11/1985 | Seely et al. . |
| 4,617,603 | 10/1986 | Johnson et al. . |
| 4,639,821 | 1/1987 | Littwin et al. . |
| 4,730,230 | 3/1988 | Helfrick . |
| 4,751,608 | 6/1988 | Schultz . |
| 4,829,397 | 5/1989 | Vernikov et al. . |
| 4,897,759 | 1/1990 | Becker . |
| 5,198,959 | 3/1993 | Scholtysik et al. . |
| 5,204,801 | 4/1993 | Becker et al. . |
| 5,270,899 | 12/1993 | Saito . |
| 5,721,665 | 2/1998 | Schultz . |

FOREIGN PATENT DOCUMENTS 60-129909   7/1985   Japan .

OTHER PUBLICATIONS

Product Brochure: Sanix, Type 3300 (No Date).
Product Brochure: Data Security, Inc., Type HD–3000, May 1997.
Product Brochure: Data Security, Inc., Type II–A, May 1997.
Product Brochure: Data Security, Inc., Type III, May 1997.
Product Brochure: Data Security, Inc., Type HD–2000, May 1997.
"Operator Manual 5661C Degausser" Rimage P/N 889057–003 Revision 03 Sep. 21, 1990. Rimage Corporation.
"Degaussing Electromagnetic Articles by the Phase Control of AC Power", by J. Reed, Western Electric Technical digest No. 33, p. 45, Jan. 1974.

*Primary Examiner*—Jeffrey Gaffin
*Assistant Examiner*—Kim Huynh
*Attorney, Agent, or Firm*—Fitch, Even, Tabin & Flannery

[57] ABSTRACT

A bulk degaussing system automatically adjusts the operating voltage of the system to achieve a predetermined level of magnetic filed strength. A microprocessor is used to monitor the transient response of the system to maintain operation at a predetermined level of stored energy or to detect impending failure.

17 Claims, 12 Drawing Sheets

TRANSIENT MAGNETIC FIELD DEGAUSSING SYSTEM WITH AUTO CALIBRATION

BACKGROUND OF THE INVENTION

1. Field of the Invention

The present invention relates to a bulk degaussing system for erasing of various magnetic media generally used for the storage of information; and more particularly to an auto-calibration system for a bulk degaussing system which automatically adjusts the operating voltage of the system to achieve a predetermined energy level.

In particular, the invention further relates to the self calibration of bulk degaussers through the detection of frequency or stored energy and subsequent adjustment of energy delivered to degaussing coils to achieve a predetermined magnetic strength. The invention further relates to the measurement of variations in the energy loss of bulk degaussing systems for the purposes of characterizing the resistive properties of the magnetic media being degaussed, and for the purposes of signaling changes in circuit resistance in cases where such changes in energy loss occur but where the magnetic media or empty degaussing volume is known to lack significant resistive properties.

2. Description of the Prior Art

Various degaussing systems for erasing magnetic media are known in the art. For example, although not applied to magnetic media in bulk, U.S. Pat. No. 2,962,560 discloses a system which utilizes decaying AC magnetic field as an optimal degaussing process. The system in the '560 patent applies a damped sinusoidal field along an information-bearing track of a revolving magnetic drum, exposing each point on the track to a field that reverses and decays.

In more recent art, in which individual tracks on magnetic tapes are erased, several factors including the period of a sinusoidal AC field of constant amplitude; the weakening of that field with distance from its source, such as an erase head; and the motion of tape with respect to that source; cooperate to cause the decaying AC effect, which generally serves to reduce tape noise by randomizing the state of the magnetic domains. Disk drives generally re-use tracks by overwriting them; however, application of track-width fields ranging from DC to random bit patterns are also known to have been used for information erasure.

Bulk degaussers are used in general in the erasure of magnetic tape when tape recorders lack such function, in which case a decaying AC field is generally used in order to erase the tape so it can be reused. In the case of a disk drive, bulk degaussing can destroy and thereby protect information, for example, when the write mechanism fails but the read mechanism remains operational. The prior art also extends bulk degaussing to protection of information on tapes. Bulk degaussers erase media faster and more thoroughly than tape recorders and disk drives and relieve the operating stress required for recorders and drives to erase media.

Bulk degaussers generally apply large magnetic fields to media in the form of tape wound on reels in tight spirals approaching concentric cylinders or concentric circular tracks on flat disks stacked in a disk drive. The effectiveness of the intended information erasure depends both on the strength of the magnetic field and its direction or range of directions relative to the information-bearing tracks on the tape and disks. The circular direction of tracks on disks and tape reels is the single most effective direction, and degausser configurations suited to apply that direction to either form can generally apply it to the other form about as well.

The strength of the degaussing field must exceed the variable switching strength of the magnetic domains in the media. Increasing the strength in a single magnetic direction beyond a few multiples of the average switching strength or the coercivity rating of the media fails to improve the erasure effect for some common media formulations. Conversely, the application of a sequence of magnetic directions generally greater than the coercivity erases the media better than a very strong field applied in a single direction.

Given the synergistic effect of radial and axial field directions being about equal to each other, and the fact that nearly cylindrical tape surfaces and circular disk surfaces reverse the orientation of tracks relative to those radial and axial directions, coil systems that rotate magnetic fields in the plane perpendicular to the axes of reel and disk forms generally erase both forms well, and coil systems that add axial directions to the sequence of magnetic fields erase even better.

Many of the prior art bulk degaussing systems employ magnets formed from inductive coil systems that are incapable of generating magnetic field volumes the size of the largest units of magnetic media to be degaussed. Such systems require a relatively long energized time period in order to mechanically transport media through the magnetic field of a coil system and to rotate the field relative to the media. Such art generally draws relatively continuous power from a source, such as an AC supply circuit, to make up for losses, for example, due to the inevitable resistance of the inductive coils. The power supplies for such systems, typically 120 Volts and 15 Amperes, places practical limits on degaussing coil systems, and the resulting strength and volume of the degaussing field that they generate.

Degaussers generating magnetic fields over long periods of time often necessitate energy storage components other than the inductive coils, such as capacitors, to improve the power factor of the inductive coils and to store large quantities of resonant energy in order to increase degaussing strength. Such prior art degaussers are often configured with coils wound on iron cores. These degaussers also generally incorporate switching circuits for limiting operation to periods when media is present or for converting the supplied AC power into a DC current.

A fundamental aspect common to such prior art systems is that the inductive coils always operate in association with their supplemental energy storage and dissipating components with a response forced by their power supplies and the associated switching components. Such responses generally go to the steady state response in a period much shorter than the operating period of the magnet.

Many coil and core geometries have been devised to concentrate, direct and shape small steady state magnetic fields. Likewise, arrays of magnets (coils with or without cores) and many combinations of linear and rotational motion, either of the magnets or of the media or both, have been applied to rotate or otherwise vary the direction of the magnetic field beyond 180° reversals while distributing it over the entire bulk of the magnetic media. Examples of such systems are disclosed in U.S. Pat. Nos.: 2,481,392, 3,938,011, 3,588,623, 4,346,426, 4,467,389, 4,639,821, 4,730,230, 4,751,608, 4,897,759, and 5,204,801. Adjustment or calibration of such systems is generally limited to variance of component values, such as selection of capacitance values at the time of production or the manual connection of trimmer capacitors. In U.S. Pat. No. 3,023,280, the current feedback limits the setting of a variable transformer to regulate the strength of the degaussing field.

When the magnetic field is smaller than the media volume, such as in the steady state prior art discussed above, mechanical failures can compromise the degaussing process. Commercial bulk degaussers, such as Model 905-, 930-, 940-, and 943- series, manufactured by Data Security, Inc., disclosed in U.S. Pat. Nos. 4,751,608 and 5,721,665, detect exceptions to such operation. These systems automatically compensate in certain cases where interactions between a load of media and the magnetic field causes predetermined motions to deviate. Even so, a human operator may misinterpret motion variations as an undetected failure, or may ignore warning indicators precipitated by an anomaly for which compensation has not been provided.

U.S. Pat. No. 3,879,754 discloses a system with multiple coils wound orthogonal to each other around cores and operating in forced response to power supplies, which may include AC excitation of one set of coils simultaneous with DC excitation of the orthogonal set of coils. Like the other prior art discussed above, the '754 patent illustrates a system with a small magnetic field volume relative to a much larger moving bulk of magnetic media. The coils of that invention, at least superficially, resemble orthogonal coils that can rotate magnetic fields electronically.

U.S. Pat. No. 4,423,460 discloses a system which rotates a magnetic field electronically using coils wound on orthogonal cores and driven toward a steady state forced response in cooperation with passive phase shifting. Complementary phase shifting of plus and minus 45° is used to improve the power factor from near zero to 0.71, which may serve to reduce line current while increasing field strength. Even so, its media-sized volume and steady state operation limit the field strength that can be generated for a particular supply circuit rating. The attenuator or the motions of this system can decay the field either electrically or mechanically. They can also calibrate it, but feedback for regulation or self-calibration is lacking. The system also discloses motion of the media but does not disclose detection nor measurement to place media within or convey it past the rotating field.

U.S. Pat. No. 2,962,560 discloses a system with a switched LC circuit which includes a capacitor initially charged to a voltage for the purpose of storing energy. Switch closure transfers energy into an inductor. Unlike the resonant energy storage function of capacitors in degaussers operating coils to the steady state, a supply circuit of low power delivers energy to charge the capacitor to predefined voltage and energy storage levels over a long period during which the coil is switched off, offering transient degaussing strength and field volume independent of the supply circuit rating.

As long as some inevitable electrical resistance remains well under a value critical to the values of capacitance and inductance, the natural transient response of such underdamped second order series LCR circuitry is an exponentially decaying sinusoid, where the values of inductance and resistance alone dictate the rate of decay, and the values of capacitance and inductance approximately dictate the frequency of the sinusoidal oscillations; the influence of the resistance on that frequency being limited by its value well under the critical damping value.

U.S. Pat. No. 4,551,782 discloses switched LC circuits capable of exponential AC decay, describing the resulting transient operation as "magnetic fields in alternating directions at successively decreasing amplitudes." That system employs one coil to generate a field the size of the media in the direction parallel to the axis of the media. A second coil situated with its axis orthogonal to the first coil is not symmetrically disposed about it or situated to generate a field the size of the media. Therefore, this system does not electrically rotate the field over the direction of the tracks, but rather it rotates the media through the second coil at a rate much faster than the oscillatory period of the sinusoidal field in order to achieve the desired decaying exposure.

The transient natural response of an LC circuit from a state of initial stored energy can be termed a "ringing signal generator" as in U.S. Pat. No. 5,270,899. That fundamental response offers the most direct means for synthesis of the desired decaying AC field. Even if a non-exponential decay rate or non-sinusoidal oscillation were desired, means such as digital synthesis and linear amplification, are not generally suited to the current and voltage levels or the component impedances of practical bulk degaussers. That system applies indexed motion alternating with generation of that decaying AC field smaller than a unit of media to expose all of the media. It measures the size of the media to calculate the number of degaussing positions desired or indexes motion in predetermined increments or both.

While the small transient field of such prior art does limit the energy storage requirement, problems can arise in its practice. First, the calculation of indexed motion increments is not clear-cut in all cases. Second, the application of magnetic fields can exert mechanical forces with the potential to physically move the media. Eddy currents, caused by oscillatory fields, generally act to center or levitate non-ferromagnetic conductors like aluminum housings and thus reduce friction between media and conveyance. Such levitation can complement attraction or repulsion of soft magnetic materials or permanent magnets used in head and spindle motors of disk drives and in a variety of other uses. Thus, if the art is applied to erasing a variety of media formats, a variable potential for positioning errors arises due to unintended media motions.

Addressing such unintended motion errors with mechanical restraint increases the system complexity, especially in the case of processing a large variety of media. Straightforward restraints like straps add to the thickness of media and thus to the volume required for the magnetic field, adversely impacting on the energy storage requirement of such systems.

Some known degaussers, such as manufactured by Sanix Corporation, are known to utilize transient field degaussers with coils that encompass media completely and so do not measure media size to calculate linear erasing positions. They do index rotation to change the direction of the field between successive transient fields.

Users of bulk degaussers view media-sized magnetic fields as a means to minimize failure-induced loss of efficacy. Degaussing systems that electrically rotates such fields do so with multiple coils. In some systems, even if one coil fails, the other coil still exposes the media volume, and even though it generates a field of sub-optimal direction with respect to much of the media volume, it can still erase those regions significantly.

U.S. Pat. No. 3,143,689 discloses a system which completely encompasses the degaussing field volume within a set of closely conforming coils, wound orthogonal to each other. This system requires a drawer for the inner coil in order to load media into that volume. Separable electrical connectors allow the drawer to operate and its coil to connect to a capacitor and switching circuitry. Flexible lead wires to the drawer may be impractical due to necessarily large wire size. Rather than relying on the natural transient response, this system connects capacitors directly to its coils and switches energy from another capacitor into the LC circuits with vacuum tubes driven by an oscillator, thereby providing the capability to force a resonant response in the circuits. It further offers means to vary the biases on the grid voltages relative to each other, which should change the direction of the plus and minus 180° oscillatory field over 90°. Its operation should yield the adequate rotation and transient decay effects if that bias is adjusted between its limits more slowly than the oscillations but more rapidly than circuit losses drain energy from the third capacitor.

U.S. Pat. No. 4,617,603 illustrates a typical solution for the avoidance of separable connectors in order to access a media-sized volume. The windings are disposed over only part of the surface defining the degaussing volume, leaving openings for access to the volume. It has been reported that the rotating field generated by such a system, as embodied in the Rimáge Corporation (formerly IXI Corp.) Model 5661C degausser, over a volume sized for 15 inch diameter media and employing such loosely conforming windings suffers significant loss of field strength 5 inches along the axis of either coil in the direction of each axis. This system also introduces microprocessor control coupled with semiconductor switching to force a response in its two LC degaussing circuits from energy stored in another capacitor. It also employs active feedback from a magnetic sensor, although the analogous voltage or current signals might be processed simply to achieve the claimed predetermined phase and amplitude relationships that rotate its field and can allow that field to decay.

The Rimáge Corp. Model UDGS-FLOOR degausser exemplifies a variation on electrically rotated transient field bulk degaussing. It features an additional coil set mutually orthogonal to both of the main coils, but wired in series with the LC circuits and switching circuit to a large capacitive energy reservoir. The field direction generated by the additional series connected coils, being orthogonal to the rotating field generated by the main coils, offers the potential of synergistic effects on erasure performance resulting from a wider range of magnetic field directions. The series connection of those coils also allows them to serve as charging reactors for the main LC circuits. Microprocessor monitoring of circuit voltages via A/D conversion in this model can time switching to force the desired phase relationship between the coil currents.

SUMMARY OF THE INVENTION

It is an object of the present invention to provide a bulk degaussing system which solves various problems in the prior art.

It is an object of this invention to provide means for self-calibration in which the system operation indicates the value of primary energy storage components and adjusts the operating voltage to achieve a predetermined energy level in subsequent operating cycles.

It is yet another object of this invention to provide means of load evaluation in which a high energy decay rate indicates either an large load or impending failure so that preventative or corrective maintenance can be initiated if the high decay rate is detected when the load is known to be low.

Briefly, the present invention relates to a bulk degaussing system and more particularly to a system which automatically adjusts the operating voltage of the system to achieve a predetermined level of magnetic filed strength. A microprocessor is used to monitor the transient response of the system to maintain operation at a predetermined level of stored energy or to detect impending failure.

DESCRIPTION OF THE DRAWINGS

These and other objects of the present invention will be readily understood with reference to the following specification and attached drawing, wherein.

DETAILED DESCRIPTION

Figure 1:
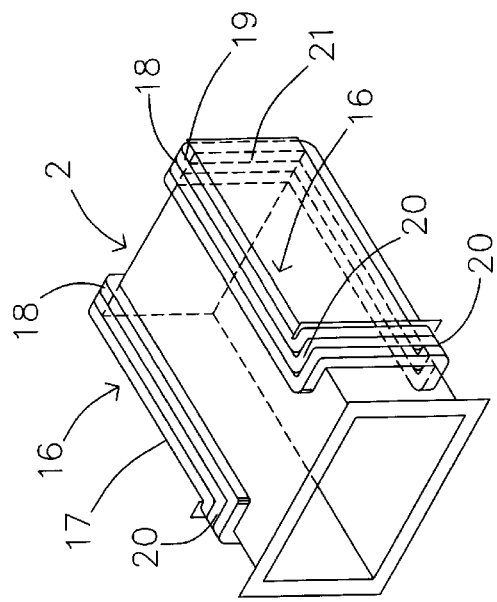
FIGS. 1A–1D represent a sequence of perspective views illustrating a method for winding one coil closely conforming to a volume while allowing access to its interior after a second, orthogonal coil is wound over it in accordance with the present invention.
Figure 1:
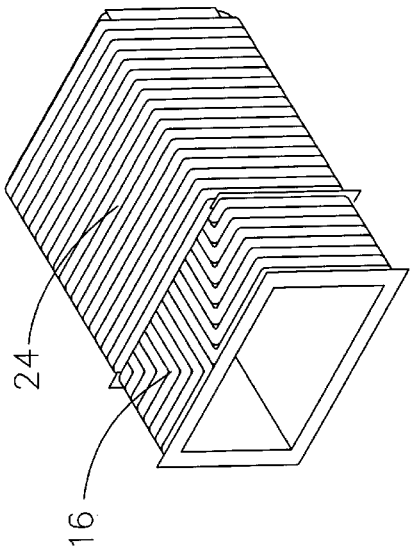
Figure 1:
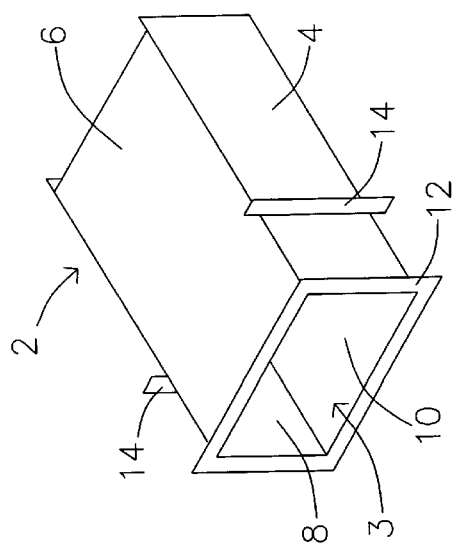
Figure 1:
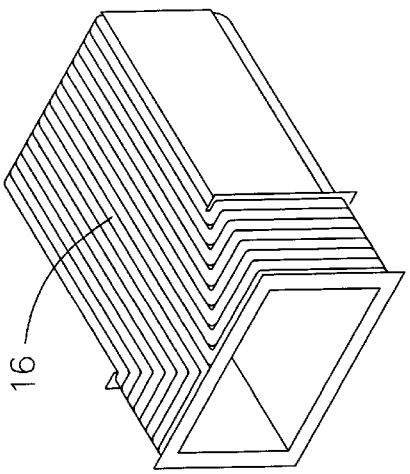

The present invention relates to a bulk degaussing system. FIGS. 1A through 1D illustrate an important aspect of the invention relating to winding of a pair of coils which forms a portion of the bulk degaussing system in accordance with the present invention. More particularly, FIG. 1A illustrates a nonconductive winding form 2, which may be generally rectangular and open on one end 3, defining five sides; a right side 4, a top side 6, completely visible in FIG. 1A, a rear side, which is not visible in this view, a left side 8 and a bottom side 10 partially visible through the open end 3. The open end 3 allows access to the degaussing volume within the coil form 2. A nonconductive flange 12 may be disposed around the open end 3 to provide strength and facilitate mounting of the coils. Intermediate nonconductive flanges 14 may also be provided to help guide a first winding, shown in the succeeding steps of winding the coils.

Figure 12:
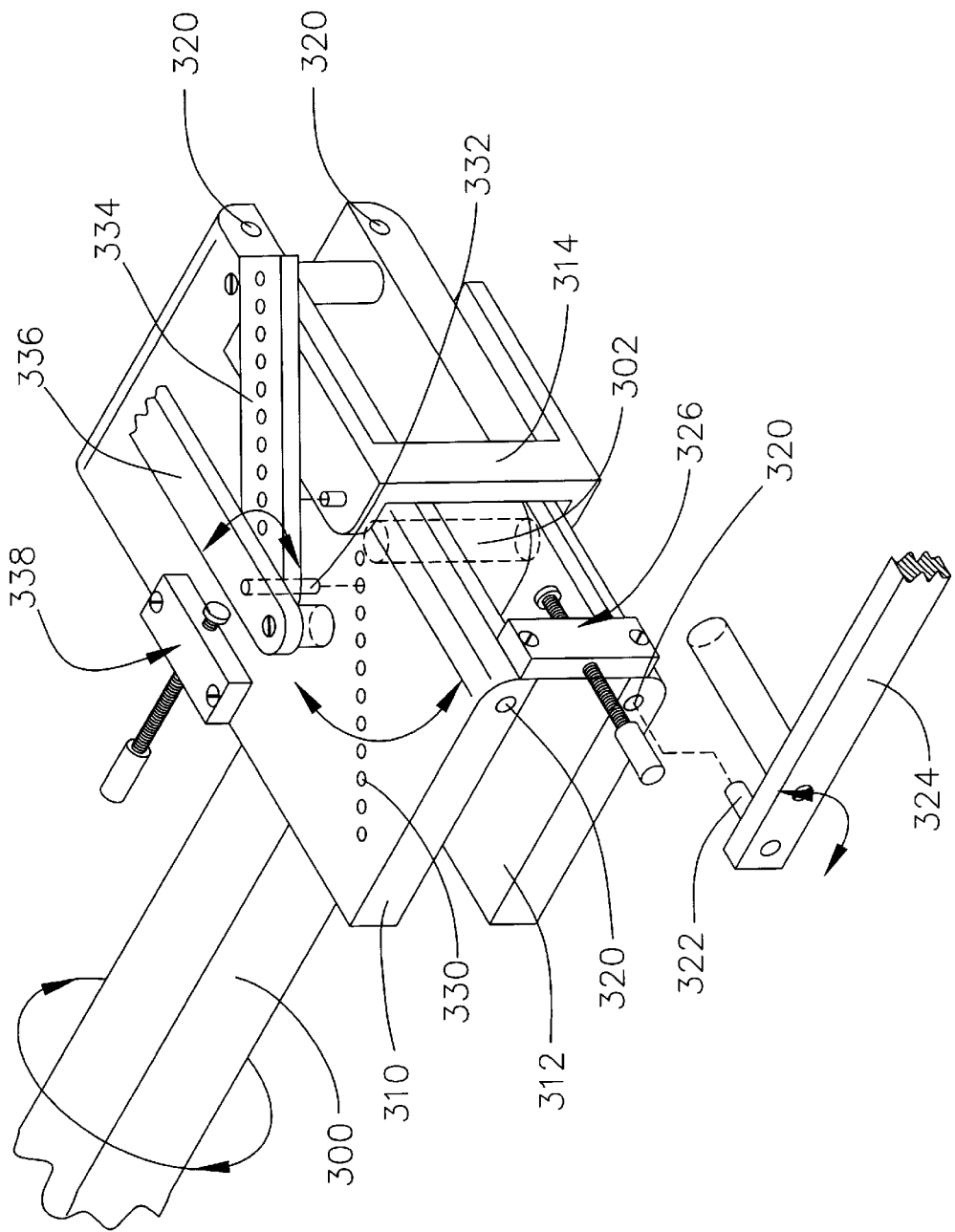
FIG. 12 is a perspective view of a bending fixture suitable for winding compound bends of the invention.

FIG. 1B illustrates the winding form 2 with a first coil 16 partially wound from two windings 17 and 19, including simple bends 18 around the rear side to vertical coil segments 21 (shown as hidden lines) connecting visible coil segments on the top surface 6 with the identical coil segments on the bottom surface 10 as well as compound bends 20 around the intermediate flanges 14 connecting top and bottom coil segments around the open side 3. Depending on the specific operating parameters of the bulk degaussing system, light gauge wire with a circular cross-section may be used and hand wound as shown in FIGS. 1B–1D. However, square cross-sectional wire may be preferable since it provides a larger cross-section than circular wire. For bulk degaussing systems with larger operating parameters, the wire gauge may become too large to form closely spaced compound bends 20 or even the tight radii simple bends 18. In such applications, for example, four strands of wire having one fourth of the requisite gauge cross-section can be used and wound by hand to form the coils 16, 24, and 26. The simple bends 18 and the compound bends 20 may be formed with a hammer using parallel strands. Alternatively, a fixture can be used as illustrated in FIG. 12 and discussed below. The first coil 16 may be wound from both sides toward the middle of the coil form 2. After completion of the two windings 17 and 19 as shown in FIG. 1C, they may be connected in series or parallel to complete the first coil 16.

FIG. 12 illustrates a fixture for winding compound bends of the invention. A support arm 300 of the fixture is allowed to rotate 360°, as indicated by the circular arrow around it, enabling the fixture to wind a continuous coil. A hidden pivot pin 302 allows the remainder of the fixture to rotate plus and minus 90° on the support arm 300 as indicated by the arrow on element 310. The various surfaces of the elements 310 and 312 adjoined by a bracket 314 precisely duplicate exterior surfaces of one half of winding form 2 visible in FIG. 1A and FIG. 1B. For example, the bracket 314 duplicates the forward facing surface of flange 14.

A plurality of pivot holes 320 accept a pivot pin 322 of a bending lever 324. The bending lever 324 is moved between the pivot holes 320 over the course of the winding coil 16 to form those portions of the coil bent over curved surfaces of the elements 310 and 312.

A plurality of pivot holes 330 accept a pivot pin 332 of the bending lever 336 further supported by an arm 334. The bending lever 336 is moved between the pivot holes 330 for each turn as the coil is wound, forming bends over the curved surfaces of the bracket 314 for the first turn of coil 16. Each subsequent position of the bending lever 336 provides a new center point for bending each subsequent turn of the coil 16 over the preceding turn.

A pair of clamps 326 and 338 are adjusted to secure the turns previously wound against the forces of subsequent bending operations. Once half of the desired turns of the coil 16 are wound on the fixture, those turns are unclamped, removed from the fixture, and mounted on the winding form 2. Then, the identical second half of the turns of the coil 16 can be wound on the fixture. Splicing of the two halves is performed on the winding form to the complete coil 16.

The degaussing volume defined within the winding form 2 need not be rectangular as illustrated. For example, the heavy gauge wire needed in practical implementation of the invention cannot be wound at extremely tight radii, and thus the compound bends 20 may extend the first winding 16 outward toward the opening 3 somewhat further than illustrated in FIG. 1B. If the portion of the degaussing volume near the opening 3 is enlarged accordingly, the inward portion can be configured very closely to some maximum media size, for example, to contain and degauss a standard size 5.25 inch disk drive. In such an embodiment, the enlarged outward portion facilitates access to extract degaussed media approaching that maximum size without additional mechanisms like drawers, which consume volume and add to costly energy storage requirements.

Once the first coil 16 is wound, a second coil 24 may be wound over the first coil 16 and orthogonal to it as illustrated in FIG. 1D without obstructing access to the interior degaussing volume. Where the two coils (16 and 24) conduct oscillatory electrical currents at a phase of 90°, the two orthogonal coils (16 and 24) rotate a magnetic field in the plane of their mutual axes. For optimum degaussing, the axis of the magnetic media, either disks or tape reels, should be oriented perpendicular to that plane of rotation. To great advantage, the closely conforming coil system of FIG. 1 rotates the magnetic field uniformly only at predetermined phases approaching 90°.

It should also be noted that coils of stiff, heavy gauge wire can be wound on a separate fixture for later assembly onto the winding form 2. In particular, the two windings 17 and 19 which form the coil 16 can be wound identically on the same fixture, not merely as mirror images of each other requiring different winding fixtures, which facilitates precise compound bending and enables production of extremely repeatable inductance values. Extreme stability of inductance can be achieved if the coils are stabilized adequately against the mechanical rigors of the transient process.

Coils conforming loosely to a degaussing volume as exemplified by the prior art may be constructed for equal inductance with relative ease, rendering the capacitances required also of equal values. However, if one of those windings is wound entirely over the first winding, enough geometric difference can be expected to render equal inductance difficult to achieve. Practical implementation of the present winding invention reveals the opposite case to be true. The extension and compound bends of the first wound coil 16 in FIG. 1 encompass a volume larger than the square media footprint to be processed. The second coil 24 encompasses the square footprint volume plus the bulk of the first coil 16. For an equal number of turns on both coils 16 and 24 as facilitated by the same wire gauge for both, the encompassed volumes are nearly equal, as are their inductances.

The energy contained by the media-sized degaussing field may be formidable. For example, the magnetic coercivity or average switching strength of commercial magnetic disks are approaching 3000 Oersteds. Application of a degaussing field strength of at least twice the coercivity is prudent. Integrated over the volume of a disk drive, the winding form 2 and stray fields outside of the winding forms 2, that strength requires peak energy storage approaching 2000 Joules in the magnetic fields of each coil. Prior art bulk degaussers constructed with steel enclosures may relieve the energy storage requirement to some extent by providing effective external shunts directing the magnetic flux lines that emanate from the coils toward the opposing ends of the coils. Considering the weight of structural steel and the ease with which it saturates, smaller, thicker internal shielding in closer proximity to the coils offers more benefit as long as a degree of insulation or spacings suited to the typical high voltage operation of the coils is maintained. Shielding can have detrimental effects as well. For one example, the few oscillatory magnetic field it conducts demands some degree of core loss due to the hysteresis of the steel, which increases the rate at which the rotating field decays. Significant decay in much less than 360° of field rotation would constitute a diminishing return, as additional initial energy storage would be required to compensate for it.

In a practical realization of the coils 16, 24 and 26, 0.32 inch square wire (0 AWG) covers a footprint of 5.25 inch disks in a disk drive with a single layer of 16 turns. That wire size and the resulting low resistance (near 0.005 Ohms) and inductance 0.00004 Henries) allow the system to operate at practical voltage and current, and with acceptably low rate of decay desirable to leave magnetic tapes noise-free for re-use. The resulting coils must conduct 10,000 Amperes in order to generate 6000 Oersteds over that volume.

Open reels of tape, floppy disks and certain tape cartridges enclosing a single reel present a generally circular or square foot print. Configuring the coil system as shown in FIG. 1 for some predefined maximum circular and square footprint inevitably leads to a volume having a rectangular cross section in the plane of magnetic field rotation with a square region of more uniformly rotating magnetic field away from the opening. The resulting volume accommodates the frequently rectangular form factors of magnetic media including tape cassettes with two reels, one of which is a generally empty "take-up reel", and disk drives with one end containing head motors instead of magnetic disks. The "supply-reel" and "disk-end" features of such media are, in general, readily discernible, enabling their optimum loading into the system in accordance with the present invention.

Even in cases of misuse, like backwards media loading, the proximity of the inner coil 16 to the open end 3 generates significant magnetic strength and in an optimal direction for the portion of media which would occupy that region. Thus the invention offers a substantially "fail safe" magnetic field volume not found in prior art where windings conform less closely to the degaussing volume and generate significantly weakened magnetic strength over multiple regions of a degaussing volume. If the media is smaller than the volume encompassed by the windings, it can be placed with latitude anywhere in the volume but preferentially away from the open side.

Figure 2:
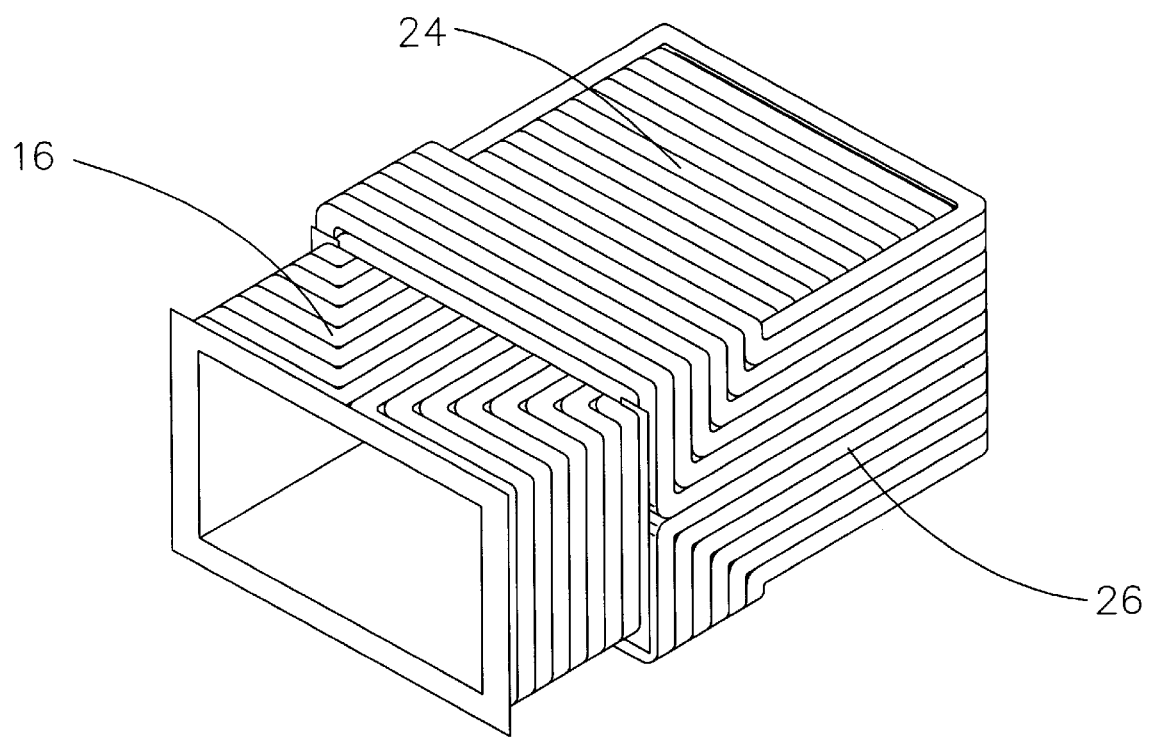
FIG. 2 is a perspective view illustrating an alternate embodiment of the invention for a third winding.

FIG. 2 illustrates an embodiment in which a third coil 26 may be wound mutually orthogonal to first coil 16 and second coil 24 and in a manner similar to coil 16 in order to admit access to the interior. The three coil system may be phased to steer the magnetic field in any direction. In practice, the coil 26 may be used as a charging inductor for circuits containing coils 16 and 24. As a result, the magnetic field could, for example, pulse in the direction of the media axis while coil 26 charges the circuits of coils 16 and 24, which would then rotate the field in the plane of the media similar to practices of prior art but with the advantages inherent from windings closely conforming to the degaussing volume.

Figure 3:
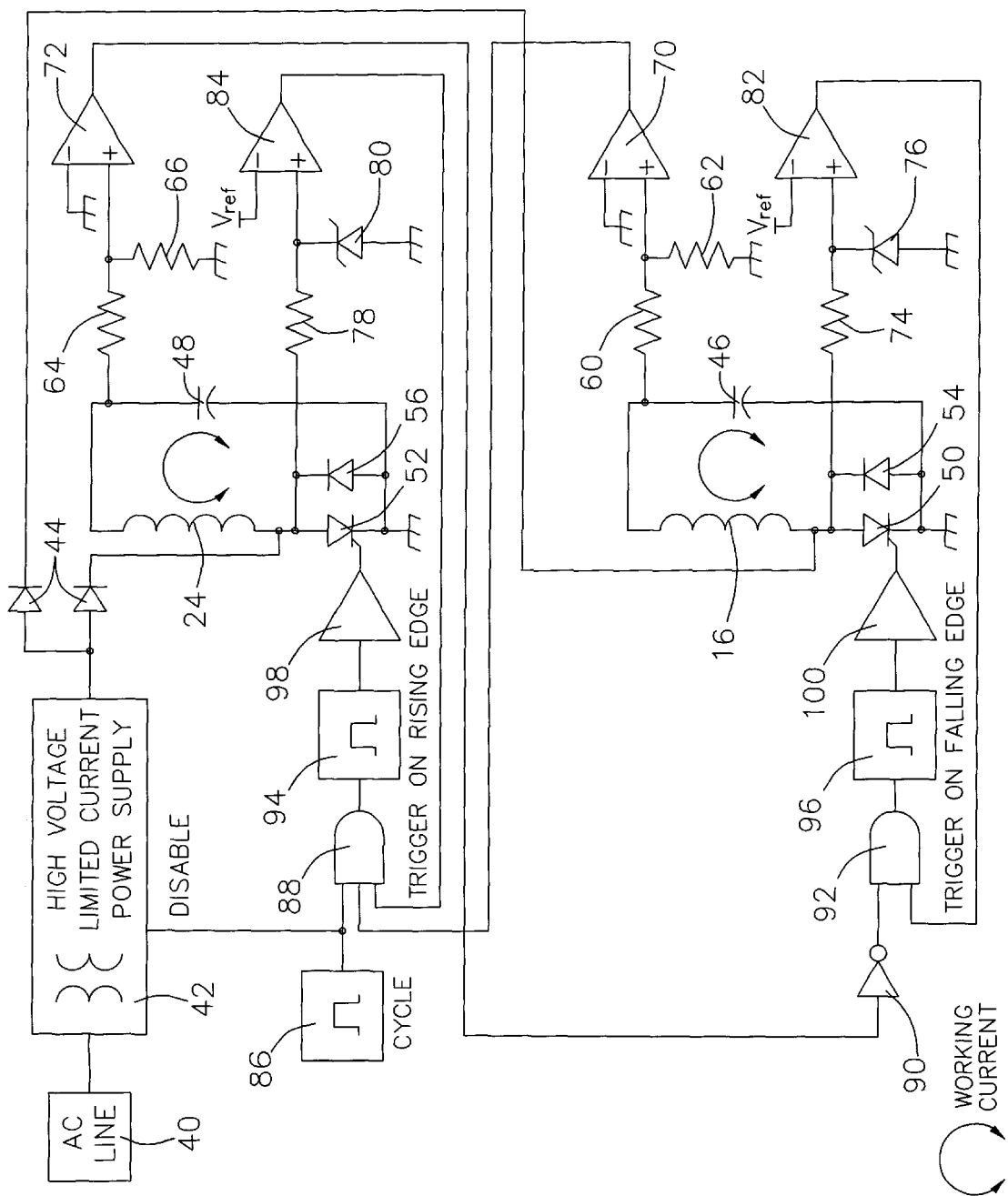
FIG. 3 is a schematic drawing for the coils, energy storage and switching means which includes circuitry to detect the phase of each coil and develop switching signals to maintain the phase of the opposite coil close to a 90° optimum for rotating the field in accordance with the present invention.

FIG. 3 illustrates a circuit for controlling the transient response of a two coil system (i.e. coils 16 and 24) shown in FIG. 1D. Energy to the transient response degaussing system is generally supplied from an AC line circuit 40 to a high voltage DC power supply 42, such as of the Glassman High Voltage, Inc. MR® series or a Berton 800 series, for example an 835-1 Kv unit with programmable voltage and current regulation with an 0–5 V or 0–10 V input. Such devices may be used in this application to limit the charge rate and guarantee a 1 minute, for example, cool down for the thyristors as their junctions heat about 50° C. in the few milliseconds of the process. In this example, a pair of diodes 44 may be used to isolate the circuits of inductive windings 16 and 24 from each other. Those circuits also include energy storage capacitors 46 and 48.

If, for practical purposes, the voltage required to be blocked by the switching thyristors 50 and 52, and their commutation diodes 54 and 56, is 1000 Volts, then the value of capacitances 46 and 48 required to store 2000 Joules is 0.004 Farads (4000 uF). The resulting LC circuits (16, 46 and 24 ,48) then oscillate near 400 Hz, which is about the practical limit for standard speed thyristors and diodes. Semiconductors rated near 500 Amperes continuous provide the necessary transient conduction ratings for decaying oscillatory currents.

After the power supply 42 charges capacitances 46 and 48 to a predetermined voltage, turn-on of the thyristors 50 and 52 initiates oscillatory currents through the inductances (i.e. coils 16 and 24) and capacitances 46 and 48. Given unavoidable resistive losses less than a critical damping level for the values of L and C, the oscillatory currents decay exponentially. As long the oscillatory currents in the two LC circuits remain at 90° phase difference, the resulting vector sum of the magnetic fields generated by coils 16 and 24 rotates and decays over time.

Any two LC circuits will inevitably have different natural frequencies due to manufacturing tolerances or component drift. If the circuits operate without correction, phase error can accumulate as the field rotates. Measurement of magnetic flux or even voltage or current followed by analog to digital conversion so that a microprocessor can calculate and generate thyristor trigger signals is computationally intensive. Earlier known systems generate a transient response of a single coil with mechanical rotation of media, apply separate uncoordinated transients in orthogonal coils, achieve limited rotation by coordinating amplitude variation in the orthogonal coils, or passively phase-shift coils wound on orthogonal cores, none of which apply active feedback to correct transient field rotation toward a uniform condition.

The present invention eliminates the need for microprocessor computation and the implied trigger timing latency in order to generate thyristor trigger signals for a predetermined phase difference. In this example, the desired phase difference in the LC circuits is 90°. Initially, when capacitances 46 and 48 are charged, signals proportionate to the LC node voltages from a voltage divider 60 and 62 and voltage divider 64 and 66 drive the outputs of comparators 70 and 72 respectively positive. A resistor 74 and a zener diode 76 detect a voltage representing the off-states of thyristor 50 and diode 54. Similarly, a resistor 78 and a zener diode 80 detect a voltage representing the off-states of the thyristor 52 and the diode 56. The respective off-state signals drive the outputs of the comparators 82 and 84 positive.

Prior to application of a cycle signal 86 to the control circuit, the positive outputs of the comparators 70 and 84, derived from charged capacitance 46 and off-states of thyristor 52 and diode 56, enable an AND gate 88; the low state of the cycle signal 86 drives the output of AND gate 88 low. The positive output of the comparator 82, derived from the off-states of thyristor 50 and diode 54, enables the AND gate 92, however the positive output of comparator 72, derived from charged capacitance 48 inverted by a NOT gate 90, drives the output of AND gate 92 low.

The cycle signal 86 lasts for the duration of the degaussing process until energy in the LC circuits decays toward zero. A debounced toggle switch can provide the charge/cycle signal 86, as can a three position switch with first ON position to provide the charge enable signal, a center OFF position, and third momentary ON position to activate a cycle pulse, preferably with a few seconds delay allowing the operator to step back from the degaussing system before it discharges. Some indicator of complete charge may be preferable in such embodiments, or simple logic to detect desired voltage, disable the supply, and pulse the cycle signal. The leading edge of the cycle signal 86 inhibits current flow from the high voltage power supply 42 to insure turn-off of both thyristors (50 and 52) at the end of the process. That signal also generates a rising edge at the output of the enabled AND gate 88, which triggers generation of a pulse by monostable multivibrator 94. Amplified by a driver 98, the pulse 94 turns-on the thyristor 52, allowing the LC circuit 24 and 48 to oscillate through one 180° half cycle, at which point the circuit current returns to zero, the thyristor 52 turns off, the capacitance 48 is charged at reverse polarity to its initial energy level minus any circuit losses, and the diode 56 enables conduction through a second 180° half cycle, charging capacitance 48 back to its original polarity and energy minus the losses of the first full cycle.

Phase-error correction of the invention is as follows. The voltage divider comprised of resistors 64 and 66 along with comparator 72 function as a zero crossing detector for the LC node voltage of coil 24 and capacitance 48. At 90° of conduction, that voltage falls through zero and the falling edge from the output of comparator 72, inverted by a NOT gate 90, generates a rising signal edge at the output of the AND gate 92. The monostable multivibrator 96 and driver 100 trigger the thyristor 50 to start conduction of the LC circuit comprised jar of coil 16 and the capacitance 46 as the LC circuit comprised of coil 24 and capacitance 48 passes through 90°. Both circuits continue to conduct until the circuit comprised of coil 24 and capacitance 48 approaches 360°, at which time the conduction of the LC circuit comprised of coil 16 and capacitance 46 approaches 270° of conduction as long as the LC values of both circuits are selected for approximately equal natural frequencies.

If the LC circuit comprised of coil 24 and capacitance 48 has the higher natural frequency of the two circuits, it will reach 360° of conduction first, at which point diode 56 assumes the off-state, and voltage detected by resistor 78 and zener diode 80 drives the comparator 84 to enable AND gate 88. Subsequent conduction of the slower second LC circuit through 270° constitutes the point at which the voltage at the LC node between coil 16 and capacitance 46 rises through zero, and the zero crossing detection by comparator 70 of the signal from the voltage divider comprised of resistors 60 and 62 drives the output of AND gate 88 high, initiating the trigger by the monostable multivibrator 94 and driver 98 to turn on the thyristor 52 for the second cycle of conduction by the LC circuit comprised of coil 24 and capacitance 48.

Trigger timing of the thyristor 52 is slightly different if the LC circuit comprised of the coil 24 and the capacitance 48 has the lower natural frequency of the two. Then the zero crossing signal of the comparator 70 enables the AND gate 88 and the diode turn-off signal of the comparator 84 initiates the trigger of the thyristor 52. Thus triggering of the thyristor 52 occurs at the logical combination of the diode 56 turn-off and voltage rising through zero of the opposite LC circuit, which constitute the 360° and 270° conduction points of the respective LC circuits. Similarly, trigger timing of the thyristor 50 is the logical AND of diode 54 turn-off with voltage falling through zero at the opposite LC node, which constitute the 0° and 90° conduction points of the respective LC circuits.

The correction of the phase error by this invention need not be restricted to 90° but may be adjusted to some other predetermined angle as might be desired for coil systems with axes that intersect at angles other than 90°. To maintain other phase angles, the function of comparators 72 and 70 may be changed to level detectors by changing the potential of their inverting inputs from ground to another appropriate voltage. Then, placing automatic gain control between the voltage dividers and the level detectors yields voltage detection representing constant phase of the decaying oscillatory voltages.

The trigger timing described above continues until energy in both circuits decays to a point at which circuit voltages impede generation of control signals or thyristor triggering. Operation to less than 10 volts is feasible so a system charged to 1000 Volts can decay to less than 1% of its initial magnetic strength. The control circuitry corrects any phase error resulting from minor differences of natural frequencies of the two LC circuits once every cycle by retarding triggering of the thyristor in the circuit having the higher natural frequency until the slower circuit "catches-up" to it.

In one coil construction method, the total length of wire wound into the first coil 16 tends to be slightly greater than that in the second coil 24. As a result, the resistance of the first coil 16 is higher, and energy in the LC circuit containing coil 16 decays slightly faster than the energy in the opposite circuit. For that reason, the circuit containing coil 24 in FIG. 3 is triggered first so that both circuits decay about to equal levels during the first 360° of magnetic field rotation that is all-important to the degaussing performance achieved. The control circuit of FIG. 3 would be equally effectively at minimizing phase error if the coils were reversed, but the uniformity of strength in the resulting system would suffer.

An advantage of inhibiting the thyristor trigger during conduction of its associated commutation diode is that the entire duration of the trigger pulse acts on the thyristor gate, which is guaranteed by incorporating the feedback path from the coil-thyristor node into the triggering logic. If the trigger pulse were allowed to start prior to diode turn-off, its duration during thyristor conduction would be uncontrolled, and the reliability of thyristor turn-on could be compromised. In practice, the thyristors trigger easily at the initial high voltage state of the system. As energy in the system decays, the thyristors require more precise trigger signals. The off-state feedback synchronizes the triggers.

The control circuit is extremely simple and robust. Any number of comparators or operational amplifiers might serve in the zero crossing and voltage detection functions. An LM319 comparator accepts the bipolar analog inputs and interfaces directly to 5 Volt logic. The 74123 dual monostable multivibrator plus one additional 2-input AND gate provide all of the logic and trigger pulse generation needed if the cycle signal 86 is active low.

In the exemplary schematic of FIG. 3, the commutation diodes 54 and 56 can be replaced with two additional thyristors. Then, additional voltage and zero crossing detectors plus one dual monostable multivibrator can trigger the additional thyristors to halve the portions of the oscillatory cycles over which phase error accumulates prior to correction.

Elements of this invention need not be restricted to the examples of FIG. 1 and FIG. 3. The winding example of FIG. 2 has already been discussed, and incorporation of the third coil or set of coils, whether wound as shown or more conventionally, does not preclude their separate dual use as both charging inductances and third-axis field generators in a system otherwise incorporating the hard-wired control of this invention.

Figure 4:
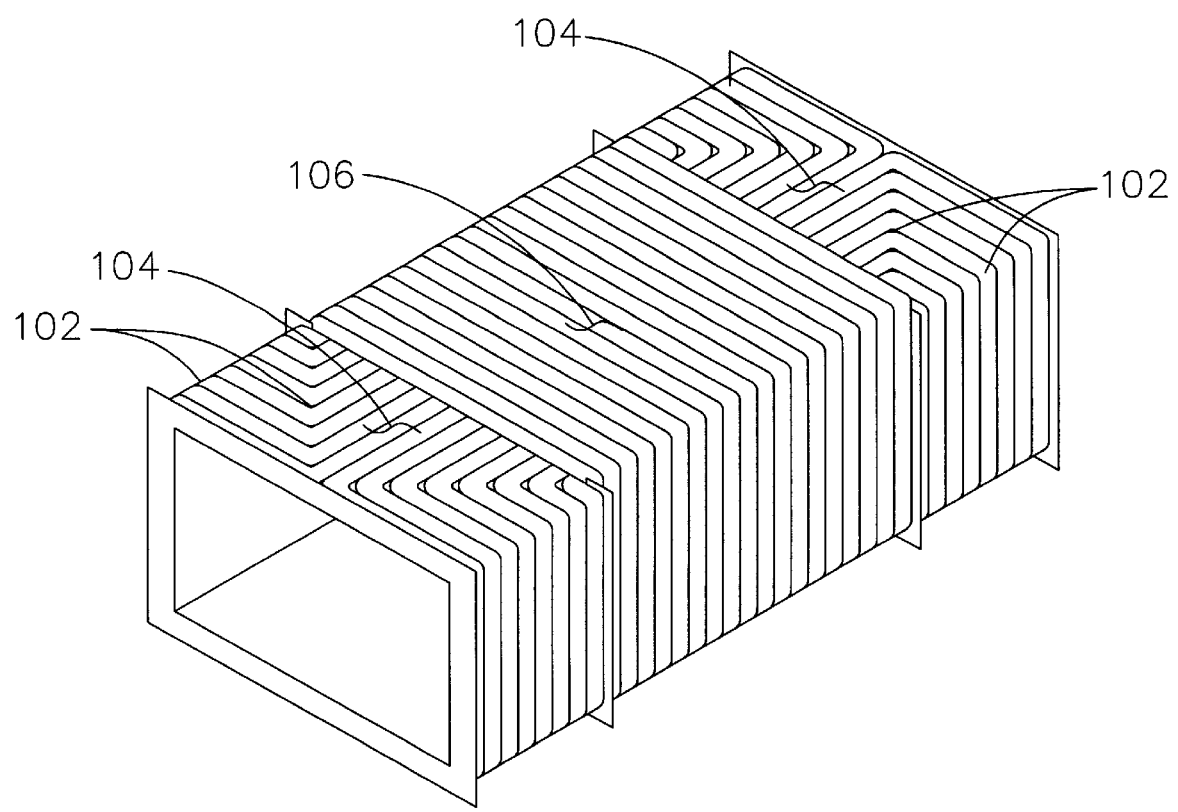
FIG. 4 is a perspective view of another alternate embodiment of the invention illustrating coil access to the volume from opposing sides which allows conveying media through it.
Figure 5:
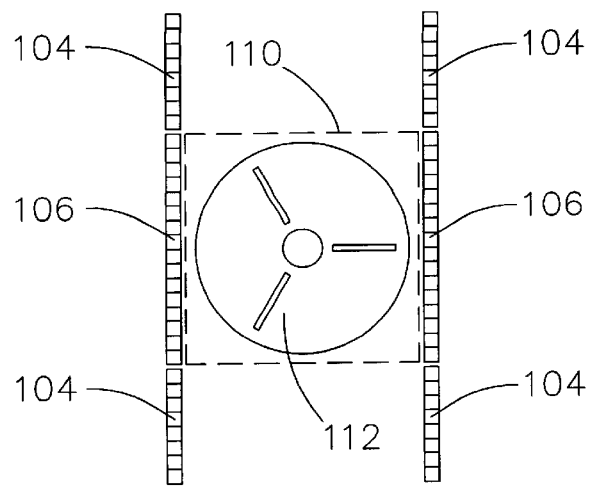
FIG. 5A–5D is a series of top views of the conveyorized configuration illustrating the sequence of indexed motions alternating with rotating field generation for various media sizes and form factors for a system in accordance with the present invention.
Figure 5:
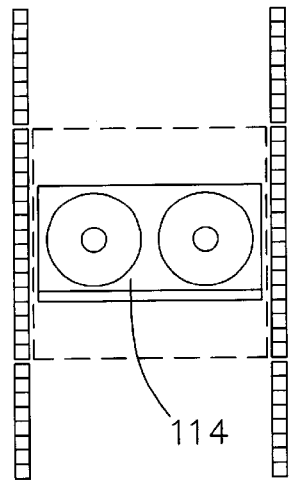
Figure 5:
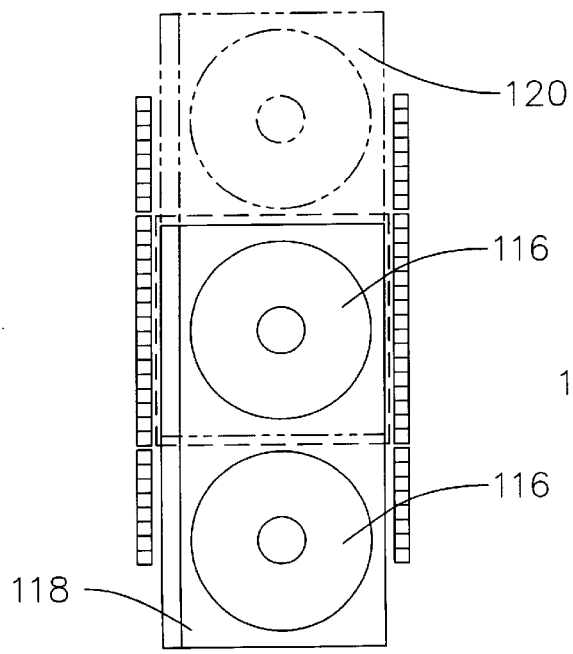
Figure 5:
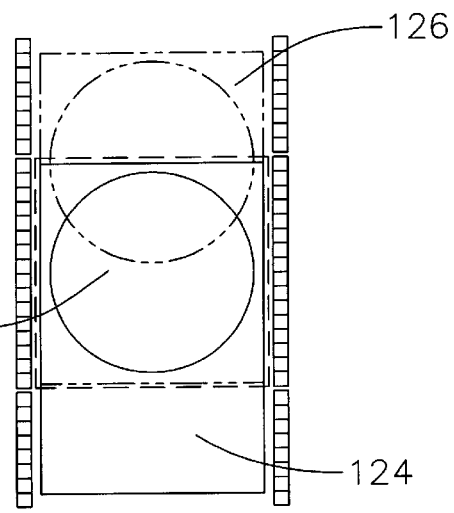

FIG. 4 illustrates a variation of the winding method of this invention whereby compound bends 102 at both ends of an inner degaussing coil 104 admit access to the degaussing volume from opposing ends, facilitating automatic loading means, such as a conveyor belt, directing media through the orthogonal coil system including outer degaussing coil 106. As shown in FIG. 5A, which represents a horizontal cross section through FIG. 4, configuring the degaussing volume of such a system as a square region, as indicated by the dashed box 110, of rotating magnetic field, limits the energy storage requirement and sets the winding geometry, easing factors like the resistance and inductance of the coils. Other field shapes like rectangular volumes approaching the maximum 2:1 aspect ratio expected for two-reeled cassettes of the largest cross section that fit in the coil system are also possible if less practical.

The square footprint degaussing volume 110 can contain a single media unit consistent with the largest square stack of floppy disks or circular reel of tape 112 that fits into the coil system as shown in FIG. 5A. Commonly, media housings present a rectangular footprint either to accommodate head motors of a disk drive or the second reel of certain tape cassettes. Problems can arise in determining the location of disks or tape in such housings. The external features of some disk drives do not suggest the disk end, and a potential exists for human error in a degaussing system designed for drives to be placed in a specific orientation. Conveyorized systems generally increase the potential for such orientation error as compared with manually loading systems.

In the case of tape cassettes with two reels, bulk degaussing is sometimes used to destroy information on the media prior to disposal because the cassette has failed with some tape stuck on both reels. A conveyorized system that treats each end of a rectangular form factor as a square media unit avoids the generally accepted practice of degaussing such disk drives and cassettes twice with re-orientation of the media in a manually loaded system.

Like prior art, conveyorized embodiments of this invention might employ one or more optical sensors measuring media size or position in cooperation with each other or with speed or position information gained from motion of the conveyor. Such sensing might be accomplished up stream from the degaussing volume or in its immediate vicinity or both, the later method offering the advantage of detecting position errors induced by interactions between media and the magnetic field. Unlike the prior art of indexed or calculated motion between magnetic field transients, a degausser with orthogonal coils cannot accept units of physical media with foot prints greater than the dimensional limits imposed by its coils. Rather, this invention admits two distinct form factors which constitute at least one of any media unit up to the size of its degaussing field.

The first form factor is circular or square as suggested in FIG. 5A, or if rectangular, then possessing a longest dimension no greater than the side of the largest square form factor or the largest diameter of a circular form factor accommodated by the orthogonal coils, said longest dimension capable of being oriented in the direction of motion, perpendicular to it as shown for cassette 114 in FIG. 5B, or otherwise as limited by the diagonal dimension of the rectangle. When the present invention measures media lengths corresponding to such form factors, where the length in the direction of motion is shorter than the largest square or diameter and thus smaller than or equal to the degaussing volume, suitable control means serve to center the position of any media housing conforming to this form factor within the degaussing volume for exposure to a single instance of the transient rotating magnetic field. In that case, the transient field exposes at least an entire media unit consisting of a tape reel in a square cartridge or a disk drive much smaller than the physical capacity of the degausser. That case can also degauss multiple media units, like both reels of a small two-reeled cassette 114, or a stack of disks.

The second form factor of this invention presents a generally rectangular footprint having a longest dimension somewhat greater than the square degaussing volume. In practice such form factors never exhibit aspect ratios greater than 2:1 consistent with two adjacent circular reels 116 circumscribed by a rectangular housing 118 as shown in FIG. 5C. In this case, the suitable position control means of the invention treats the media housing as two square media units, each having a side equal to half of the longest dimension, which is always in the direction of conveyance since it would not otherwise fit into the degaussing volume defined by the coils. The suitable control means centers each of those squares in the degaussing volume separately during individual instances of the transient rotating magnetic field, the second such instance indicated by phantom position 120 in FIG. 5C.

Rather than calculating degaussing positions in terms of the field size, suitable control means for this invention calculates positions in terms of square or circular media units abutting ends of rectangular housings, as in the case of a disk 122 in FIG. 5D within a rectangular drive housing 124 having longest dimension greater than the size of the square degaussing volume and aspect ratio much less than 2:1. As with the large cassette 118 in FIG. 5C, a degausser of automated conveyance requires two instances of the transient rotating field to completely expose a large disk drive housing, one instance for position 124 in FIG. 5D and another instance for phantom position 126.

Again in this case of large rectangular media footprints, the degausser exposes a volume consistent with at least one entire media unit, for example an entire reel of tape as described in the prior art rather than a portion of it as practiced in that art, such media units commonly housed in pairs or with head motors within housings that present the rectangular footprint. Unlike prior art, the conveyorized embodiment of this invention does not serve to reduce energy storage requirements with a stationary field smaller than a media unit. Rather, it exposes all portions of a media housing to a rotating field equal to or larger than the media units it can contain, whether or not such individual portions of the housing contain actual media, an empty reel, or primarily head motors, precluding any possibility that a portion thereof remains unexposed to the erasing field.

A conveyorized embodiment of this invention as discussed below does not preclude a continuous train of media housings presenting random form factors and touching each other in a manner obstructing the measurement of individual housing sizes. In this case, the apparent aspect ratio of the media goes to infinity, but the suitable position control means need only revert to a mode of indexing the conveyance in increments equal to the length of the square degaussing volume between transient fields. The instance of the rotating transient field may then expose either one or more media units, multiple portions of media units such as the trailing portion of a unit partially processed in the previous transient field along with the leading portion of a media unit with a trailing portion to be processed in the subsequent transient field, or portions of media units along with empty portions of media housings.

Figure 6:
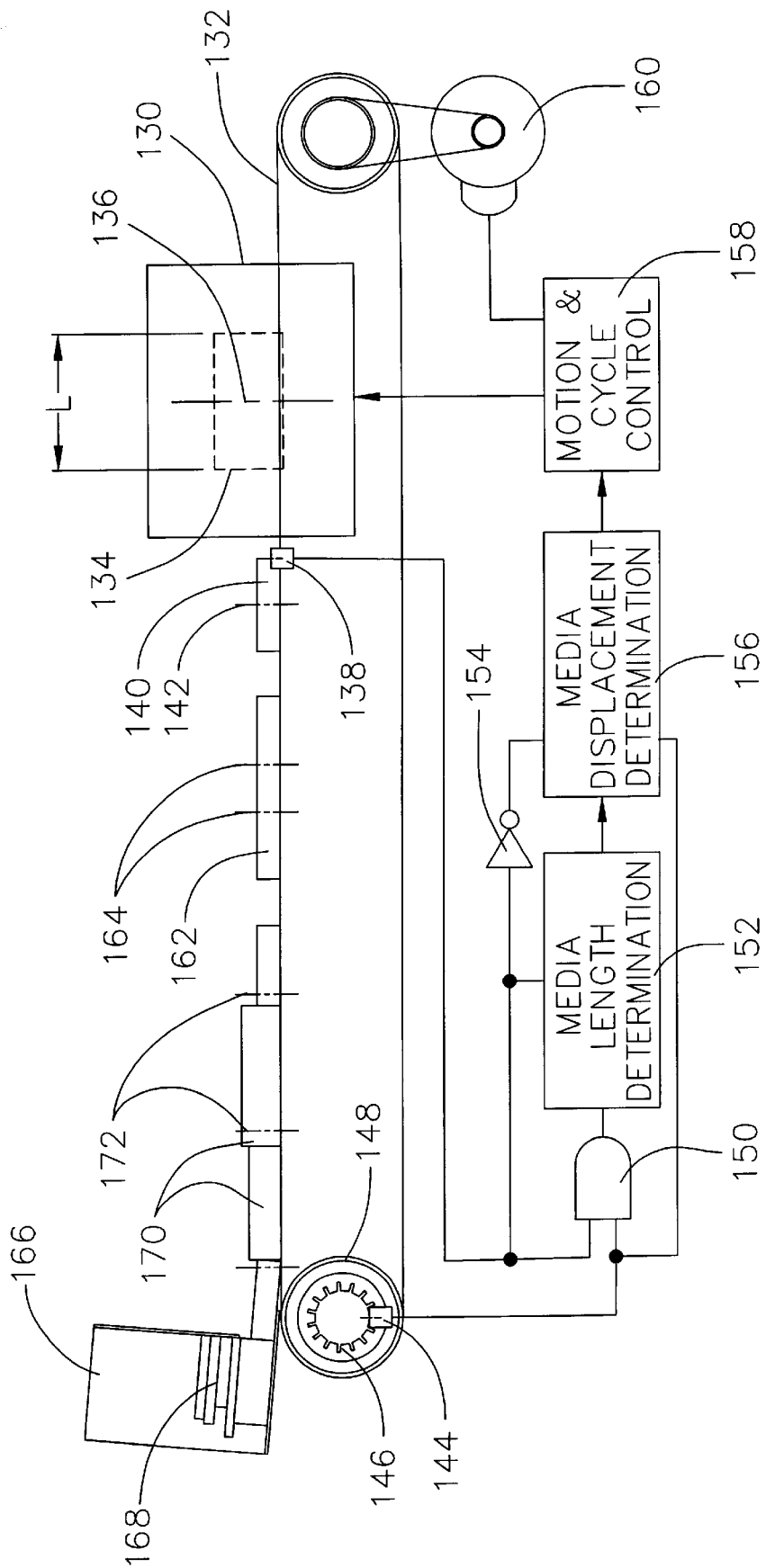
FIG. 6 is a side view of the conveyorized configuration with sensors and a motor connected to control elements illustrated in block diagram form.

FIG. 6 illustrates a measurement and positioning system along with control circuit in schematic and block diagram form suited to an automated conveyorized embodiment of this invention. In order to conserve electrical power, the power supply 42 (FIG. 3) can be disabled by way of the DISABLE signal until the magnetic media is within the degaussing volume 134. The various calculations may be determined by a microprocessor for example, a Motorola HC805. The rectangle 130 represents the outer extents of the coils 104 and 106, which admit passage of a conveyor belt 132 through the effective magnetic field volume (i.e. degaussing volume), represented by a rectangle 134, having a field length L with a center plane seen in side view as a line 136.

An the optical transmission sensor 138, such as those used in the Data Security, Inc. MP-14 model degaussers or the Garner Industry 4000 model degaussers, detects media, such as the smaller media unit 140, positioned so that its leading edge just blocks the sensor. Another similar optical transmission sensor 144 detects slots on the wheel 146 representing rotation of a roller 148 and displacement of media on the conveyor belt 132 in increments much smaller than a typical media unit. An AND gate 150 combines the outputs of sensors 138 and 144, generating a pulse train. The media sensor 138 enables length block 152 to count belt displacement units from the sensor 144 to determine the length of the media unit. Cessation of the media signal from sensor 138 as suggested by signal inversion by the NOT gate 154 initiates calculation of subsequent displacement of the media unit by the displacement block 156.

Smaller media units 140 have a length shorter than or equal to the field length L and can be assumed to have an axis 142 centered between its extents, even though it might actually comprise a small disk drive housing with an offset disk axis or a small cassette housing with two reel axes, none of which need be collinear to the assumed axis. Larger form factors like a housing 162 with extents up to twice the field length L are treated as two media units and thus assumed to have two axes 164, each of which is half the field length L from the nearest extent toward the opposing extent. An automatic feed mechanism 166 might drop a stack of housings 168 onto the conveyor so that they touch each other, in which case the effective extents of touching housings 170 exceed twice the field length L. In this case, and the media axes 172 are assumed to be spaced at intervals of the field length L with the first such axis one-half of the field length from the leading edge of the touching housings 170.

Depending on the count value contained by length block 152, the displacement block 156 assumes one of three calculation modes to determine the amount of displacement to position the media unit 140 in the magnetic field or degaussing volume 134. For the case of a smaller media unit 140, the displacement calculation: Displacement=(Length/2) minus the distance from the axis 142 of the sensor to the field center 136; provides the correct subsequent displacement to position the magnetic media in the magnetic field volume 134. The displacement may be determined in various ways, such as multiplying the speed of the conveyor 132 by the off time of the optical sensor 138 or by counting slots on the wheel 146. This displacement signal is provided to a motion and cycle control block 158 to activate a motor 160 prior to the next instance of transient magnetic field generation by the coils 104, 106. This to place the assumed media axis 142 on the center plane 136 at the time of field generation.

For the case of the media housing length 142, which is longer than the field length L but less than or equal to twice that length L, the displacement block 156 calculates the displacement units required to move the leading extent of the housing 162 to the field center 136 distance plus one-half field length L prior to the first instance of a transient field generation, and then to move the trailing extent of the housing 162 to the field center 136 distance minus one-half field length prior to the second instance of a transient field generation.

For the case of the touching media housing lengths, which exceed twice the field length, the displacement block 156 calculates the displacement units required to move the leading extent of the housing to the field-center 136 distance plus one-half field-length L prior to the first instance of a transient field generation, and then to move the touching housings 170 in field length increments for subsequent instances of transient field generation, until detecting the trailing extend of the touching housings 170. The displacement block 156 then calculates the final increment needed to move the trailing extent of the housing equal to the sensor to the field center distance minus one-half field length L prior to the final instance of transient field generation. Placing ribs on a conveyor belt perpendicular to the direction of motion can prevent the case of touching housings and constrain the positioning errors induced by physical interaction between media and the magnetic field. The passage of such ribs can define the degaussing positions as for example by activating a limit switch. Even without ribs, the conveyor can have features of a timing belt or chain whereby motion is indexed in precise increments of the magnetic field length if application is limited to formats where positioning errors induced by physical interaction between media and the magnetic field do not occur. Even a conveyor belt of constant speed and a transient field control timed to allow field-length motion increments between transient fields would suffice.

This invention and especially embodiments featuring automatic loading and unloading, either from a single side or conveyorized through opposing sides, can be adapted to operate with a variety of supplemental coil configurations in addition to the basic configuration of orthogonal windings. For example, the field of a supplemental coil generating magnetism perpendicular to the plane of field rotation generated by the orthogonal coils need not be contiguous with the rotating field as shown in FIG. 2 and as practiced in the prior art of loosely conforming windings, but can be located at another point in the conveyor pathway, where it can still serve both to expose media to an axial field in order to gain a synergistic effect, and as a charging inductor for LC circuits containing the orthogonal coils and subsequently generating the rotating magnetic field.

The disposition of supplemental coils in proximity to but not truly orthogonal with or symmetric about field rotating coils allows inductive coupling between them, such that the supplemental coil can transfer energy to the field rotation coils magnetically instead of by conduction and electrically isolating the circuitry generating the rotating field from an energy reservoir supplying the supplemental coil. In that embodiment as in prior art, the invention incorporating at least one closely conforming coil with compound bends or hard-wired phase error correction means can more easily and efficiently transfer energy between various energy storage circuits in forced transient responses, re-using that energy to generate different magnetic directions, and even recovering some portion of that energy for use in subsequent operating cycles.

Figure 7:
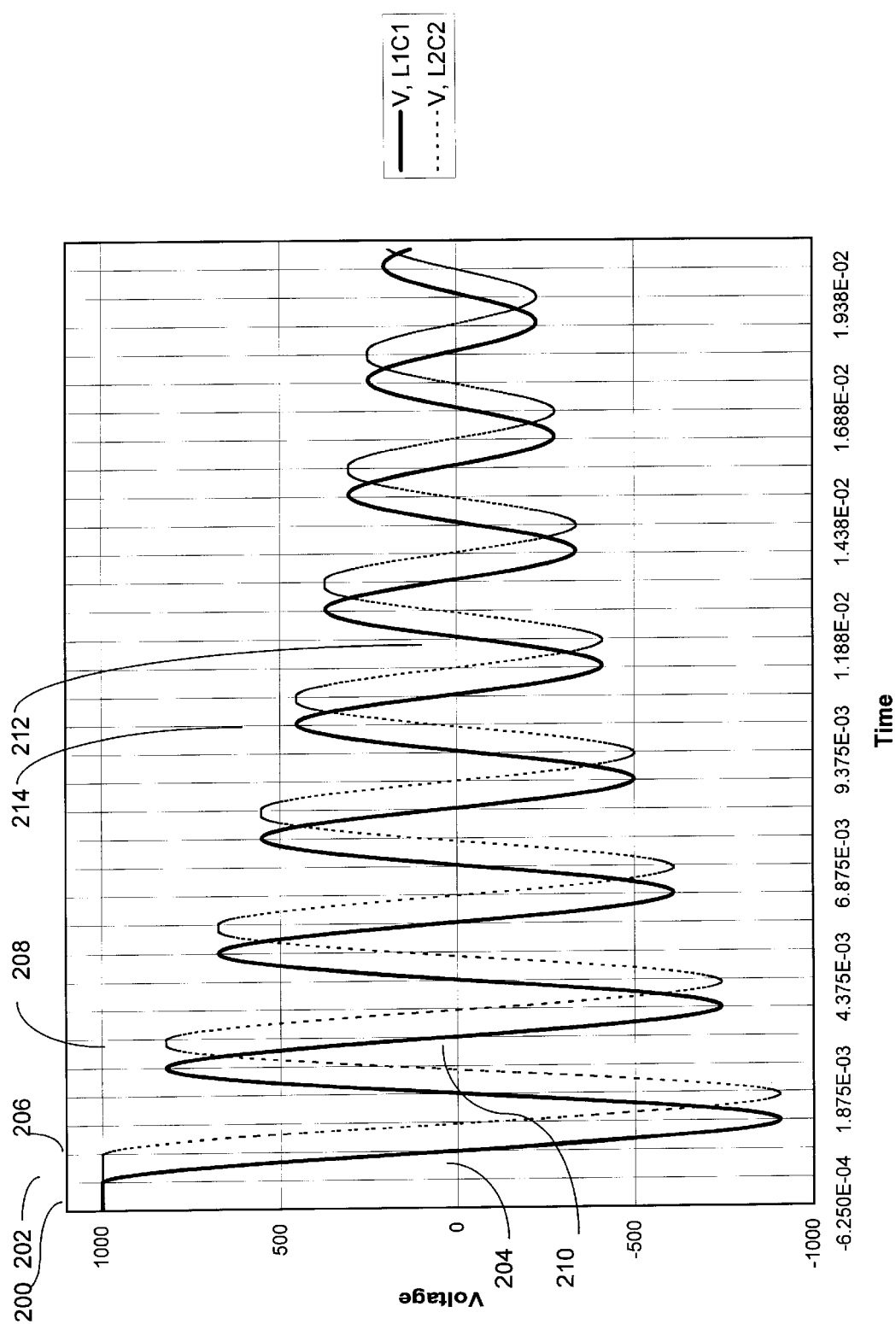
FIG. 7 is a plot of the natural transient voltage response of a degaussing circuit and illustrates phase correction by the invention.

FIG. 7 illustrates relationships between time and LC node voltages for this invention characteristic of operation with the volume empty, but also approached from typical light loads, such as a single single tape cartridge degaussed in the volume. Based on classical equations for second order responses, the theoretical values in this example result from inductances of coils 16 and 24 both equal to 0.000038 Henries and total circuit resistances of 0.006 Ohms. The example includes 0.0042 Farads of capacitance 48 and 0.0038 Farads of capacitance 46, both initially charged to 1000 Volts as indicated by line segment 200 extending to time zero corresponding to the first vertical grid line 202 and the initial triggering of thyristor 52. As discussed above, the phase control circuitry detects zero crossing 204 and triggers the thyristor 50 at time 206.

The mismatch of capacitance in the example of FIG. 7 results in the LC circuit 16 and 46 being the faster of the two, flattening the top 208 of its waveform corresponding to the simultaneous off states of the thyristor 50 and the diode 54 until a subsequent zero crossing 210 triggers the second conduction of the thyristor 50.

A debounced toggle switch can provide a charge/cycle signal function 86, as can a microprocessor. Although this invention does not require control by a microprocessor, its elements do provide signals to serve double duty in the correction of phase error and in monitoring of the process by a microprocessor to access the integrity and efficacy of the system. For example, the logical OR of pulses for the four zero crossings of opposite slope at the LC nodes in the two circuits AND with the semiconductor turn-off signals can trigger analog to digital (A/D) conversion of the LC node voltage signals multiplexed from the nodes between resistors 60 and 62, and between resistors 64 and 66.

That same ORed zero crossings signal applied to the time capture interrupt input of a Motorola® 6805C8 microcontroller allows the interrupt firmware to store the time of the zero crossings 204, 210, and those of opposite slope and second LC node corresponding approximately to the times represented by each vertical grid line in FIG. 7 That same interrupt firmware polls the pulse signals to verify that the correct sequence of zero crossings generates the interrupt requests, it alternates an analog multiplexer to sample the circuits alternately per that sequence, and it stores peak circuit voltages 206, 208 and those of opposite polarity and second LC node also occurring at the times represented by each vertical grid line. Thus, the microprocessor can capture a detailed set of process data and generate an alert if the process deviates from predetermined limits. For example, the 6805C8 microcontroller can easily acquire and store twenty samples of 16-bit time values from its internal timer, voltage values from a 12-bit A/D converter like the Analog Devices AD7895, and 4 bits, one representing each of the zero crossing signals, corresponding to peaks from time zero to 0.00188 seconds at 212 of FIG. 7.

If process data is compared to limits, the comparison may recognize that magnetic media placed in the degaussing volume is a variable with two possible effects on system operation. First, media like a disk drive could contain large masses of ferromagnetic material like head and spindle motors as well as a steel fly-wheel. Such material would increase the inductances of both coils and lower the frequency of operation. Second, disk drives contain large masses of conductive but not necessarily ferromagnetic material. Eddy currents induced in such material effect resistance additive to that in the LC circuits that dictates the decay rate of the oscillatory currents.

Figure 8:
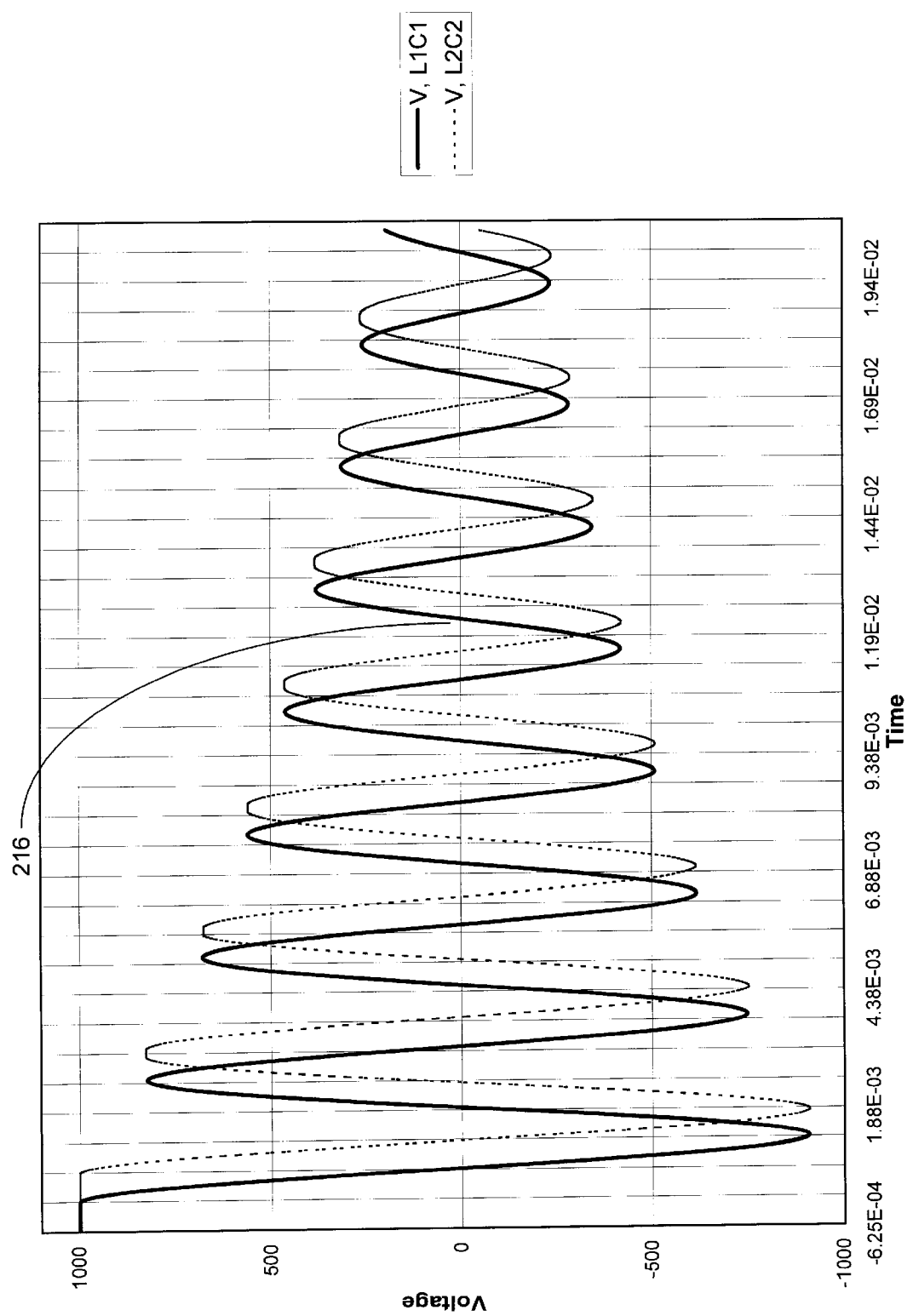
FIG. 8 is a plot of the natural transient voltage response of a degaussing circuit in the case where the degaussed media adds a significant inductive effect to the degaussing circuits.

FIG. 8 illustrates the effect of a ferromagnetic load that increases the effective inductance of each LC circuit by 5 percent to 0.000040 Henries. In the case of a ferromagnetic load the peak voltages are virtually unaffected, but the zero crossing times are progressively retarded beyond the vertical grid lines until at the twentieth sample 214 the retardation has exceeded half of a nominal sampling period. Subsequent to capture of the last data sample by the interrupt firmware, the evaluation firmware can calculate the difference between the no-load twentieth sample 212 and the retarded twentieth sample 216, and then cause display of a number or symbol representing the inductive increase.

Figure 9:
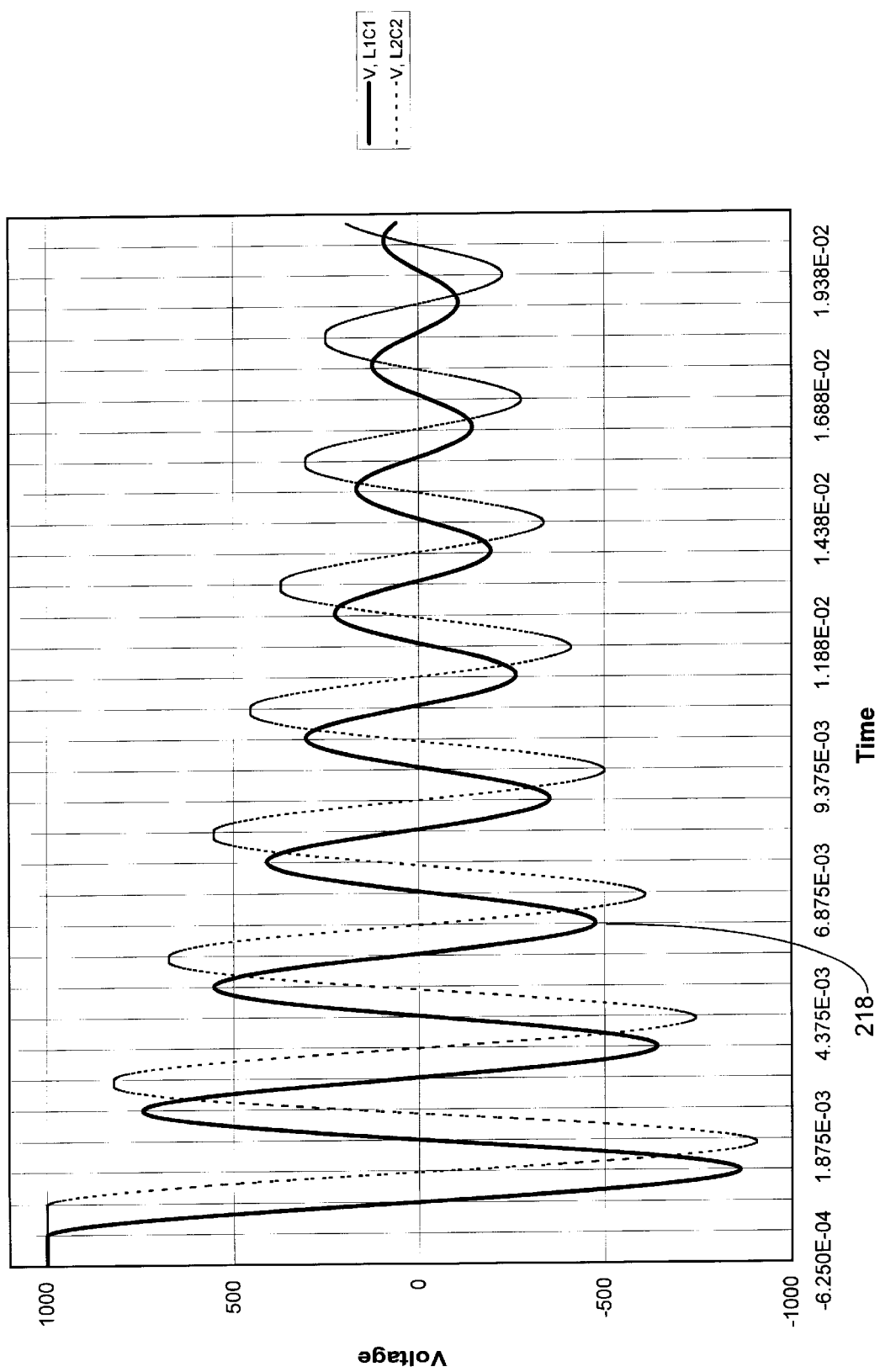
FIG. 9 is a plot of the natural transient voltage response of a degaussing circuit but illustrates the case where an impending catastrophic failure increases resistance in one circuit by 0.003 Ohms (50%).

Conductive loading need not be the sole cause of the increased decay rate. FIG. 9 illustrates the action dictated by an increase of 50 percent in the resistance of the second LC circuit to 0.009 Ohms, as might result from a loose wiring connection on the verge of precipitating catastrophic failure. In the nominal example of FIG. 7, the voltage peak does not fall below 50 percent of the initial 1000 Volt charge until the seventeenth voltage sample 214. In the case of impending failure represented by FIG. 9, the absolute value of the second LC circuit voltage fails to reach 50 percent of the initial charge on the eleventh sample 218. Subsequent to capture of the last data sample by interrupt firmware, evaluation firmware can count samples until decay reaches some predetermined point and then cause display of a number or symbol representing the resistive increase.

Displays representing inductive and resistive circuit values can facilitate the maintenance of the degaussing system. The human operator needs to be aware of typical results corresponding to various load conditions, but in practice most loads result in no significant deviations from nominal operation, while the most massive disk drives cause mostly an increased decay rate. Based on knowledge of a simple load rule like "ignore resistive load indicators when degaussing disk drives" a human operator can be trained to recognize that resistive load indicators in the absence of such loading indicates the possibility of an impending catastrophic failure that deserves preventative maintenance.

High voltage capacitors suited to this invention are sometimes constructed of series-wired sections. A short in one of those sections significantly increases capacitance, decreasing frequency of operation and thus increasing the time of a zero crossing from a nominal value 212 by a factor typically greater than a load-induced retarded value 216. Thus, a very large value of inductive load indicator can be recognized an partial failure and effective end-of-life of a capacitor, again signaling the need for preventative maintenance.

Unlike the inductive coils 16 and 24, capacitors appropriate for this invention are difficult to produce to a tolerance of better than 10%. Appropriate capacitor types include metallized-film constructions with self-healing properties in the event of point breakdowns in the film. Although self-healing can extend the useable life of such capacitors, a reduction of value to 90% of the original value due to self-healing is not unknown. Specification of about 20% excess energy storage capacity is about as practical as adding trimmers to achieve a precise initial value and is vastly superior to automatic or manual adjustments of individual trimmer capacitors to achieve constant energy operation.

Over-specified capacitors need not always operate at their limits to achieve a predetermined energy level contained by the magnetic field of a bulk degausser. If the inductance and resistance values are precise and stable as fostered by this invention, then the damped frequency depends only on the capacitance values. Zero crossing times 204, 210, and 212 acquired by a microprocessor are inversely proportional to the square root of capacitance values and thus to the capacitance voltage required for storage of a predetermined quantity of energy.

For self-calibration purposes, it is convenient to run a process cycle with no media in the degaussing field in order to obtain nominal values for zero crossing periods and voltage decay rates. Self-calibration of the degaussing system can be implemented using the flow of operations shown in FIG. 10. The process period is not influenced by the initial charge, so the self-calibration cycle can utilize a fixed arbitrary initial voltage, as for example that minimum voltage corresponding to the maximum expected value of capacitance due to manufacturing tolerance. Then the firmware can activate a cycle to acquire process data resulting from that charge. The firmware can reject the calibration cycle data if a low resistance factor indicates that the cycle was improperly performed with a significant load. That period expected for the minimum capacitance capable of storing the desired energy level at the maximum system voltage can then be subtracted from the actual period of the calibration cycle. A negative result indicates that capacitance has been reduced to an end-of-life value. Dividing the difference by a predetermined constant yields a factor that can be used as an index to look-up the voltage to which the capacitances should be charged in normal operation in order to achieve the desired energy storage level and degaussing field strength.

Figure 10:
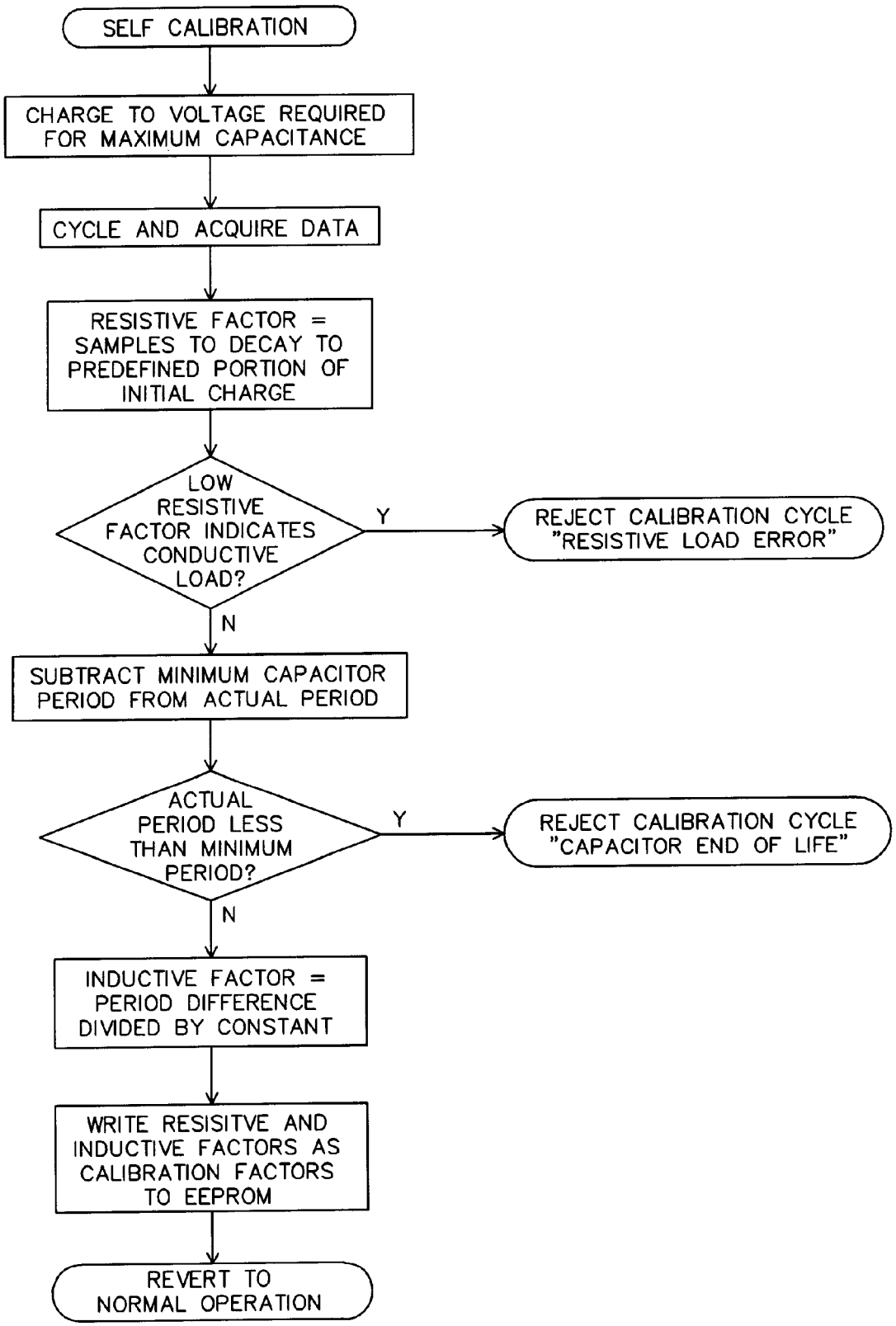
FIG. 10 illustrates the flow of operations by a microprocessor by which process data can be used to characterize the condition of degaussing system elements and provide means for self-calibration of the degaussing system.

After self-calibration results in no-load operation proportional to that of FIG. 7 and calculation of calibration factors as shown in FIG. 10, the microcontroller can store the calibration factors in a non-volatile erasable memory device, such as an EEPROM, to be recovered whenever power is applied to the system.

Figure 11:
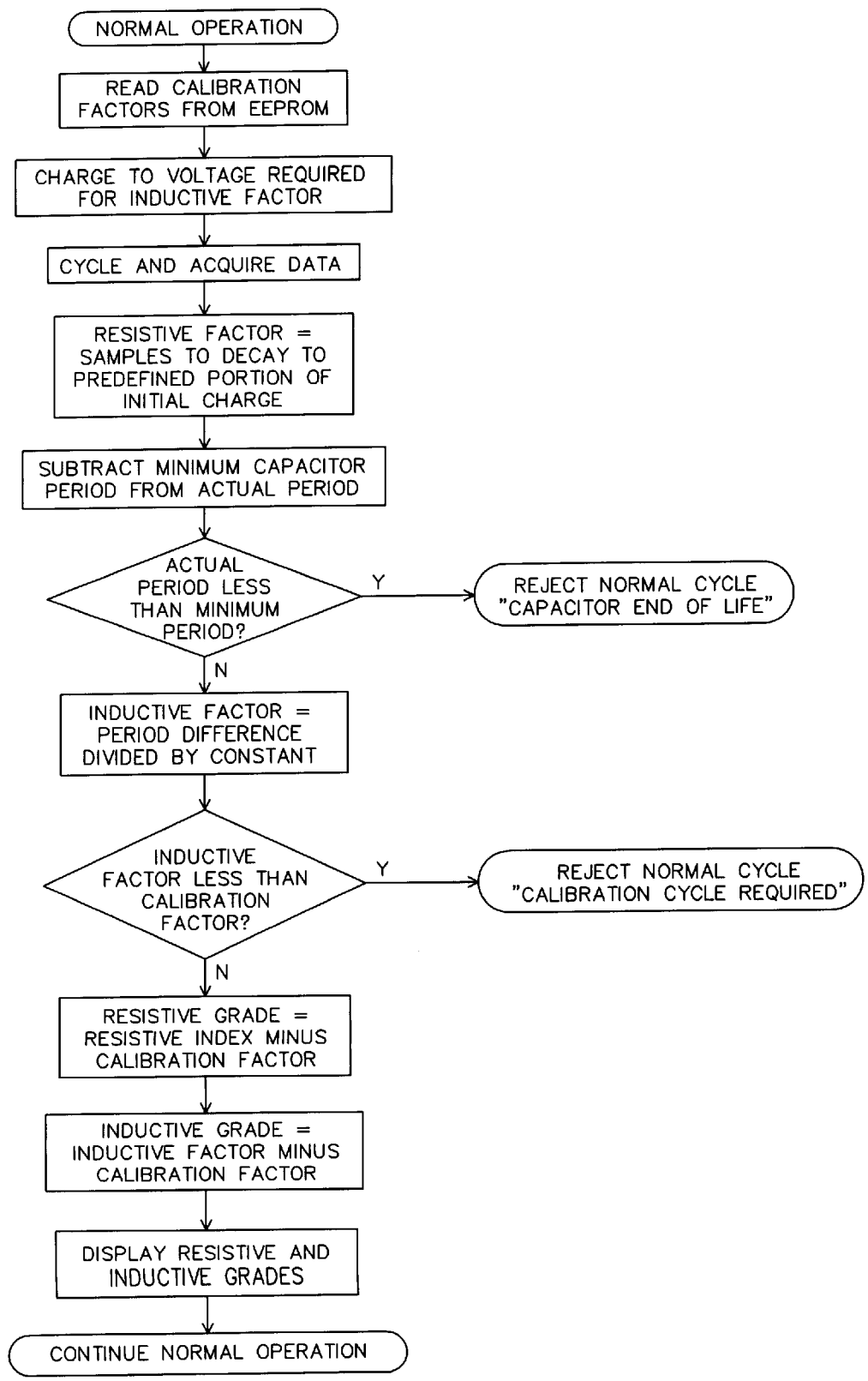
FIG. 11 illustrates the flow of normal operations using self calibration results to regulate the degaussing strength and using process data to characterize the combined effects of the media load being degaussed and the condition of the degaussing system elements.

During normal operation as shown in the flow of operations shown in FIG. 11, firmware can charge the capacitances to that voltage indicated by the inductive calibration factor prior to initiating a cycle. Then, the process evaluation firmware can calculate the resistive factor for that cycle, reject a cycle shorter than the period representative of capacitor end-of-life while displaying an error message, or else calculate an inductive factor for the cycle. If the cycle inductive factor is less than the calibration factor, then firmware can reject the normal cycle with an error message instructing need to repeat the self-calibration process. The firmware can accept the cycle if its inductive factor is greater than or equal to the calibration inductive factor.

In addition to the simplicity required for their calculation, the resistive and inductive factors used for self-calibration offer advantages of independence from irrelevant operating factors. For example, the resistive factor relates to decay from the initial, self-calibrated voltage and not from a fixed constant voltage value. Similarly, the inductive factor relates to the period and is independent of initial voltage.

In alerting a human operator to the load characteristics detected for an operating cycle, the self-calibrated degaussing system need not display the actual factors calculated for that cycle. Instead, the respective calibration factors may be subtracted from the inductive and resistive factors calculated for the cycle. The system can then display those results as inductive and resistive "grades" for the cycle. Results approaching zero indicate conditions unchanged from that of the calibration cycle. Then, the human operator can then associate results greater than zero either as indicative of the known load for that cycle, or as indicative of impending catastrophic failures deserving preventative maintenance in cases where the load is known to be light.

In calculating inductive factors, the exemplary process flow charts of FIGS. 10 and 11 actually measure the periods of the slower of the two LC circuits. As capacitors produced in the same lot generally exhibit values much closer to each other than the overall manufacturing tolerance and can be expected to age at equal rates, tolerable deviations from predetermined minimum energy requirements can be expected in spite of such averaging. Alternatively, some configuration of this invention could benefit from different charging voltages and operate LC circuits at frequencies different from each other, in which case the flat top 208 of one wave form would broaden but an effective degree of field rotation might persist.

In cases of different desired voltage charging levels, the diodes 44 could be replaced by relay switches, or separate high voltage power supplies could be provided for each LC circuit accompanied by appropriate control circuitry. Then, addition of sensing provisions to the invention, such as measurement of thyristor-diode off-state periods, could supplement the data already described and enable individual self-calibration of each LC circuit.

Load evaluation and self-calibration by this invention need not be limited to degaussing systems with phase control of multiple windings. Load evaluation and self-calibration is easily adaptable to prior-art single coil transient response systems as well. In a steady state DC or AC degaussing system, the invention could measure the natural transient response that occurs when the forcing function of the power source is disconnected from the system at the conclusion of a degaussing process or as a preliminary step in the process, in order to perform similar calibration calculations for purposes of energy regulation in such steady state systems.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A system for providing self-calibration of a bulk degaussing system for erasing magnetic media comprising:

a first LC circuit having a first coil L and a first capacitor C defining a first node therebetween;

a second LC circuit including a second coil L and a second capacitor C defining a second node therebetween;

a power supply selectively coupled to said first and second LC circuits for selectively charging said first and second LC circuits to predetermined values;

means for measuring and storing predetermined operating parameters defining calibration factors of one or more LC circuits;

a zero crossing circuit for monitoring the voltage at said first and second nodes and providing signals representative of said zero crossings at said first and second nodes; and a switching circuit coupled between said power supply and said first and second LC circuits for selectively coupling said power supply to said first and second circuits as a predetermined function of said zero crossing signals and said calibration factors in order to maintain a predetermined phase difference between the voltage of said first LC circuit relative to said second LC circuit.

2. The system as recited in claim 1, wherein one of said predetermined operating parameters include the resistance of said one or more LC circuits.

3. The system as recited in claim 2, wherein said switching circuit includes means for controlling said switching circuit to charge one of said first and second LC circuits to a predetermined voltage when no media is present.

4. The system as recited in claim 3, further including means for determining the period for the voltage on said LC circuit to decay to a predetermined portion of said predetermined voltage defining a resistive factor when no media is present.

5. The system as recited in claim 4, further including means for comparing said resistor factor with a first predetermined value.

6. The system as recited in claim 5, further including means for comparing said period with a second predetermined value providing a difference value.

7. The system as recited in claim 6, further including means for dividing said difference value by a third predetermined value defining an inductance factor.

8. The system as recited in claim 7 further including means for storing said one or both of said resistive and inductive factors as calibration factors as a function of the comparison of said resistive and inductive factors with predetermined factors.

9. The system as recited in claim 8, further including means for charging one of said first and second LC circuits to a predetermined voltage corresponding to a stored calibration factor when media is present.

10. The system as recited in claim 9, further including means for determining said resistive factor when media is present and comparing said resistive factor.

11. The system as recited in claim 10, further including means determining said inductive factor when media is present.

12. The system as recited in claim 1, wherein one of said predetermined operating parameters include zero crossing periods of said one or more LC circuits.

13. The system as recited in claim 12, wherein one of said predetermined operating parameters includes the voltage decay rate of said one or more LC circuits.

14. The system as recited in claim 1, wherein said measuring and storing means includes means for measuring said predetermined operating parameters when no media is present.

15. The system as recited in claim 14, wherein said measuring and storing means also includes means for measuring and storing said predetermined operating parameters when media is present defining a normal operating cycle.

16. The system as recited in claim 14, further including means for comparing said predetermined operating parameters obtained during said calibration cycle with predetermined values and providing an indication of a faulty calibration cycle as a function of the results of the comparison.

17. The system as recited in claim 15, further including means for comparing said predetermined operating parameters obtained during said calibration cycle with predetermined values and providing on indication of a faulty calibration cycle as a function of the results of the comparison.

* * * * *

UNITED STATES PATENT AND TRADEMARK OFFICE
CERTIFICATE OF CORRECTION

PATENT NO. : 5,959,824
DATED : September 28, 1999
INVENTOR(S) : Schultz, et al.

It is certified that error appears in the above-identified patent and that said Letters Patent is hereby corrected as shown below:

IN THE CLAIMS:

Claim 8; column 21; line 19; after "7" insert --,--.

Claim 17; column 22; line 27; delete "on" and insert --an--.

Signed and Sealed this

Twelfth Day of December, 2000

Attest:

Q. TODD DICKINSON

*Attesting Officer*     *Director of Patents and Trademarks*